United States Patent [19]
Dougnier et al.

[11] Patent Number: 5,370,858
[45] Date of Patent: Dec. 6, 1994

[54] PROCESS FOR THE SYNTHESIS OF ZEOLITES HAVING AN ALUMINOSILICATE FRAMEWORK BELONGING TO THE FAUJASITE STRUCTURAL FAMILY, PRODUCTS OBTAINED AND THEIR USE IN ADSORPTION AND CATALYSIS

[75] Inventors: Francois Dougnier, Illzach; Jean-Louis Guth, Brunstatt; Joel Patarin, Mulhouse; Didier Auglerot, Lons, all of France

[73] Assignee: Societe Nationale Elf Aquitaine, Courbevoie, France

[21] Appl. No.: 936,114

[22] Filed: Aug. 27, 1992

[30] Foreign Application Priority Data

Aug. 28, 1991 [FR] France .................. 91 10690

[51] Int. Cl.$^5$ .................. C01B 33/26; B01J 29/06
[52] U.S. Cl. .................. 423/704; 423/328.2; 423/330.1; 502/64
[58] Field of Search ............ 423/705, DIG. 21, 702, 423/328.2, 330.1; 502/64

[56] References Cited

U.S. PATENT DOCUMENTS

| | | | |
|---|---|---|---|
| 3,306,922 | 2/1967 | Barrer et al. | 423/705 |
| 4,376,757 | 3/1983 | Hinnenkamp et al. | 423/702 |
| 4,879,103 | 11/1989 | Vaughan | 423/705 |
| 4,931,067 | 6/1990 | Vaughan et al. | 423/705 |
| 5,116,590 | 5/1992 | Vaughan et al. | 423/705 |

*Primary Examiner*—Anthony McFarlane
*Attorney, Agent, or Firm*—Burgess, Ryan and Wayne

[57] ABSTRACT

An aluminosilicate gel containing a structuring agent ST and having a composition appropriate for crystallizing as a zeolite of the faujasite structural family is prepared, and then subjected to a crystallization to form a zeolite precursor consisting of the said zeolite containing the structuring agent ST in its cavities and channels, and zeolite is produced by calcination of the said precursor. The structuring agent ST consists of at least one compound chosen from the polyoxaalkylamines and/or polyoxaarylamines of general formula:

$$H_{(3-y)}N[(C_mH_{2m-1}X\text{—}O)_n\text{—}R]_y \qquad (I)$$

in which X denotes a hydrogen atom, a —OH radical or an alkyl or aryl group which may be different from one unit to the next, R represents a hydrogen atom or a $C_1$ to $C_3$ alkyl radical which may be different from one chain to the next, m is equal to 2 or 3 and may be different from one unit to the next, n is a number ranging from 1 to 4 and y a number ranging from 1 to 3.

26 Claims, No Drawings

PROCESS FOR THE SYNTHESIS OF ZEOLITES HAVING AN ALUMINOSILICATE FRAMEWORK BELONGING TO THE FAUJASITE STRUCTURAL FAMILY, PRODUCTS OBTAINED AND THEIR USE IN ADSORPTION AND CATALYSIS

FIELD OF THE INVENTION

The invention relates to a process for the synthesis of zeolites having an aluminosilicate framework belonging to the faujasite structural family. It also relates to the products obtained and to their use in adsorption and catalysis.

BACKGROUND OF THE INVENTION

Zeolites are crystallised tectosilicates. The structures consist of assemblies of $TO_4$ tetrahedra forming a three-dimensional framework by the sharing of oxygen atoms. In zeolites of the aluminosilicate type which are the most common, T represents tetravalent silicon as well as trivalent aluminium. The three-dimensional framework mentioned above exhibits cavities and channels which possess molecular dimensions and receive cations which compensate the charge deficit liked with the presence of trivalent aluminium in $TO_4$ tetrahedra, the said cations begin in general exchangeable.

As a general rule, the composition of zeolites may be represented by the empirical formula $(M_{2/n}O, Y_2O_3, xZO_2)$ in their dehydrated and calcined state. In this formula Z and Y denote respectively the tetravalent and trivalent elements of the $TO_4$ tetrahedra, X denotes an electropositive element of valency n such as an alkali metal or an alkaline earth metal and constitutes the compensation cation and x is a number which may vary from 2 to theoretical infinity, in which case the zeolite is a silica.

Each type of zeolite possesses a distinct microporous structure. The variation of the micropore dimensions and forms from one type to the other leads to changes in the absorbing properties. Only molecules which have certain dimensions and forms are able to penetrate into pores of a specific zeolite. Owing to these remarkable characteristics, zeolites are particularly adapted to the purification or separation of liquid or gaseous mixtures as, for example, the separation of hydrocarbons by selective adsorption.

The chemical composition, with, in particular, the nature of the elements present in the $TO_4$ tetrahedra and the nature of the exchangeable compensation cations, is also an important factor involved in the selectively of adsoprtion and above all in the catalytic properties of these products. They are used as catalysts or catalyst supports in the cracking, reforming and modification of hydrocarbons as well as in the synthesis of many molecules.

RELATED ART

Many zeolites are found in nature, they are aluminosilicates whose availability and properties do not always correspond to the requirements of industrial applications. As a result, the search for products having new properties of which zeolite A (U.S. Pat. No. 2,882,243), zeolite X (U.S. Pat. No. 2,882,244) and zeolite Y (U.S. Pat. No. 3,130,007) may be mentioned.

The zeolites of the faujasite structural family are characterised by a structure having a three-dimensional framework which may be described by assembly of modules called cubo-octahedra. Each of these modules consists of 24 tetrahedra containing the Si and Al elements in our case and bridged by oxygen according to the principle described above. In the cubo-octahedron, the tetrahedra are linked so as to form eight cycles with six tetrahedra and six cycles with four tetrahedra.

Each cubo-octahedron is linked, within the framework of tetrahedral coordination, through four cycles with six tetrahedra, to four neighbouring cubo-octahedra.

To show the relationships which link the various members of the structural family, it is convenient to consider the structural planes in which the cubo-octahedra are arranged at the apexes of a plane network of hexagons. Each cubo-octahedron is also linked to three neighbours in the structural plane.

The fourth bond direction is directed alternately on one side and on the other side of the structural plane and permits and linking of cubo-octahedra between neighbouring and parallel structural planes.

All the solids belonging to the faujasite structural family possess interconnected channels having a diameter of approximately 0.8 nm. Faujasite is thus a zeolite having an aluminosilicate framework whose structure corresponds to the stacking of three distinct structural planes, ABC corresponding to a structure of cubic symmetry.

It is possible by synthesis from an aluminosilicate gel to obtain compounds of the same structure as faujasite.

The general process for the synthesis of zeolites having an aluminosilicate framework belonging to the faujasite structural family consists in a hydrothermal crystallisation of sodium aluminosilicate gels of specific compositions and containing a structuring agent consisting of a metal cation.

More precisely such a process consists in making first of all a reaction mixture having a pH larger than 10 and containing water, a source of tetravalent silicon, a source of trivalent aluminium, a source of hydroxide ions in the form of a strong base, a source of metal cations $M^{n+}$, n being the valency of M, in such a way as to obtain an aluminosilicate gel having the composition required to permit its crystallisation as a compound of the faujasite structural family, and then maintaining the gel obtained, directly or after preliminary maturing, at a temperature at most equal to 150° C. and under a pressure at least equal to the autogenous pressure of the mixture consisting of the said gel for a duration sufficient to carry out the crystallisation of this gel.

As indicated above, such a process does not permit the synthesis of zeolites with an aluminosilicate framework having the structure of cubic symmetry of faujasite and a Si/Al ratio larger than 3.

French Patent Application No. 89 11949 describes the synthesis of zeolites of the faujasite structural family, characterised by Si/Al ratios which may be larger than 3, by using as structuring agent monomethylic ethers of polyethylene glycol.

It has now been found that the polyoxaalkylamines and/or polyoxaarylamines have the property of orienting the crystallisation of aluminosilicate gels towards zeolites of the faujasite structural family characterised by Si/Al ratios which may be larger than 3. These molecules bring about an important stabilising effect, which makes it possible to decrease the concentration of the hydroxide ions in the synthesis medium, which leads as a result to a higher Si/Al ratio and to a substantial improvement in yield.

BRIEF DESCRIPTION OF THE INVENTION

The object of the invention is therefore a process for preparing zeolites having an aluminisilicate framework belonging to the faujasite structural family and exhibiting a Si/Al ratio which is larger than 1 and may exceed 3, the said process being of the type which consists, first of all, in making a reaction mixture having a pH larger than 10 and containing water, a source of tetravalent silicon, a source of trivalent aluminium, a source of hydroxide ions in the form of a strong base and a structuring agent ST in such a way as to obtain an aluminisilicate gel having the composition required to permit its crystallisation as a compound of the faujasite structural family, then maintaining the gel obtained, optionally after preliminary maturing, at a temperature at most equal to 150° C. and under a pressure at least equal to the autogenous pressure of the mixture consisting of the said gel for a period of time sufficient to carry out the crystallisation of this gel as a zeolite precursor consisting in the zeolite trapping the structuring agent ST in its cavities, and in subjecting the said precursor to a calcination to destroy the structuring agent and to produce zeolite, and it is characterised in that the structuring agent ST consists of at least one compound chosen from the polyoxaalkylamines and/or polyoxaarylamines of general formula:

$$H_{(3-y)}N[(C_mH_{2m-1}X—O)_nR]_y \quad (I)$$

in which X denotes a hydrogen atom, an —OH radical or an alkyl or aryl group which may be different from one unit to the next, R denotes a hydrogen atom or a $C_1$ to $C_3$ alkyl radical which may be different from one chain to the next, m is equal to 2 or 3 and may be different from one unit to the next, n is a number ranging from 1 to 4 and y a number ranging from 1 to 3.

The quantity of structuring agent ST present in the reaction mixture intended to form the gel is advantageously such that the molar ratio ST:$Al^{III}$ ranges from 0.4 to 4, the said ratio ranging preferably from 0.5 to 3.

DETAILED DESCRIPTION OF THE INVENTION

In particular, the ingredients making up the reaction mixture giving rise to the aluminosilicate gel are employed in such a way that the said gel has, in terms of molar ratios, the following composition:

|  | Advantageous intervals | Preferred intervals |
|---|---|---|
| $Si^{IV}$:$Al^{III}$ | 2 to 20 | 4 to 10 |
| $OH^-$:$Al^{III}$ | 2 to 12 | 3 to 10 |
| ST:$Al^{III}$ | 0.4 to 4 | 0.5 to 3 |
| $H_2O$:$Al^{III}$ | 40 to 200 | 50 to 150 |

Examples of structuring agents corresponding to the formula given above are such that
tris(3,6-dioxaheptyl) amine of formula
$(CH_3OCH_2CH_2OCH_2CH_2)_3N$
tris(3,6-dioxaoctyl) amine of formula
$(C_2H_5OCH_2CH_2OCH_2CH_2)_3N$
tris[5-(2-methoxyphenoxy)-3-oxapentyl] amine of formula
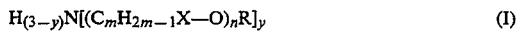
$(CH_3O(C_5H_4)_aOCH_2CH_2OCH_2CH_2)_3N$
bis(3,6-dioxaheptyl) amine of formula
$(CH_3OCH_2CH_2OCH_2CH_2)_2NH$
bis(3,6-dioxaoctyl) amine of formula
$(C_2H_5OCH_2CH_2OCH_2CH_2)_2NH$ The use of structuring agents according to the invention leads to the formation of zeolites having the structure of cubic symmetry of faujasite.

Finely divided solids silicas in the form of hydrogels, aerogels or colloidal suspensions, water-soluble silicates such as alkali metal silicates such as sodium silicate, the hydrolysable silicate esters such as tetraalkylorthosilicates of formula $Si(OR)_4$ in which R denotes a $C_1$ to $C_4$ alkyl radical such as methyl and ethyl may be mentioned as sources of tetravalent silicon $Si^{IV}$ usable in the preparation of the reaction mixture intended to form the aluminosilicate gel.

The source of silicon is used in the form of a true aqueous solution, in the case of water-soluble silicates or of an aqueous suspension which may be colloidal, in the case of finely divided silicas.

Materials suitable as sources of trivalent aluminium $Al^{III}$ are aluminium salts such as aluminium sulphate, nitrate, chloride, fluoride, acetate, oxides and hydronyoxides, aluminates and especially alkali metal aluminates such as sodium aluminate and aluminium esters such as aluminium trialkoxides of formula $Al(OR)_3$ in which R denotes a $C_1$ to $C_4$ alkyl radical such as methyl, ethyl or propyl.

The source of hydroxide ions is chosen from strong inorganic bases, especially hydroxides of the alkali metals of group IA of the Periodic Table of Elements and hydroxides of the alkaline earth metals Ca, Sr and Ba, and the strong organic bases, especially quaternary ammonium hydroxides, preference being given to the inorganic bases especially to sodium hydroxide NaOH.

The reaction mixture intended to form the aluminosilicate gel may also contain cations $M^{n+}$ of at least one metal M, of valency n, other then metals whose hydroxides are strong bases, in total amounts such that the molar ratio $M^{n+}$:$Al^{aIII}$ is at most equal to 0.4 and preferably at most equal to 0.3. The said cations $M^{n+}$ are introduced into the said reaction mixture in the form of salts such as sulphates, nitrates, chlorides or acetates or else in the form of oxides.

Mixing of the ingredients constituting the reaction mixture intended to form the aluminosilicate gel may be carried out in any order whatever.

The said mixing is advantageously carried out by first of all preparing at room temperature a basic aqueous solution containing a strong base, the structuring agent ST and the cations $M^{n+}$ if they are used, and then incorporating into this solution an aqueous solution of the source of trivalent aluminium in an aqueous solution or a suspension, colloidal or not, of the source of tetravalent silicon. The pH of the reaction mixture, whose value is larger than the 10, is preferably in the vicinity of 13.5. Before initiating gel crystallisation, crystallisation nuclei may be added to the reaction mixture intended to form the said gel in a quantity advantageously ranging from 0.1 to 10% by weight of the reaction mixture.

The nuclei may be produced by milling a zeolite of the faujasite type, that is to say of the same nature as the crystalline phase to be produced. In the absence of addition of nuclei, it is advantageous to subject the aluminosilicate gel, formed from the reaction mixture, to maturing in a closed vessel at a temperature below the crystallisation temperature for a period which can range from approximately 6 hours to approximately 8 days. The said maturing may be carried out in static conditions or with stirring. Crystallisation of the aluminosilicate gel, with or without nucleus, takes place by heating the reaction mixture at a temperature of not more than 150° C. and preferably ranging from 90° C. to 120° C. and at a pressure corresponding at least to the autogenous pressure of the reaction mixture forming the gel. The heating period needed for the crystallisation depends on the compensation of the gel on the crystallisation temperature. It ranges generally from 2 hours to 30 days.

The crystals obtained, referred to as zeolite precursors and consisting in zeolite trapping the structuring agent and the hydration water of the cations in its pores and cavities, are separated from the crystallisation medium by filtration, then washed with distilled or deionised water until aqueous washings become slightly basic i.e. have a pH lower than 9. The washed crystals are then dried in an oven at a temperature of between 50° C. and 100° C. and preferably in the region of 70° C.

The zeolite is obtained from the precursor crystals by subjecting the said crystals to a calcination, at a temperature above 300° C. and preferably between 400° C. and 700° C. for a period of time sufficient to remove the structuring agent and hydration water of the cations contained in the precursor.

As indicated above, the zeolites prepared by the process according to the invention have Si/Al ratios which are larger than 1 and may exceed 3 and exhibit a structure of cubic symmetry of the type of that of faujasite.

The characterisation of the products according to the invention, namely the precursors stemming from the crystallisation and the zeolites themselves resulting from the calcination of the precursors, may be carried out by means of the following techniques:

Electron microscopy:

Under the electron microscope, the products of cubic structure show themselves in forms compatible with cubic symmetry (for instance regular octahedra).

X-ray diffraction diagram:

This diffraction diagram is obtained by means of a diffractometer by employing the conventional powder method with copper $K_\alpha$ radiation.

An internal standard makes it possible to determine accurately the values of the angles $2\theta$ associated with the diffraction peaks. The various interlattice distances ($d_{hkl}$), characteristic of the sample, are calculated from the Bragg relationship.

As estimate of the measurement error $\Delta(d_{hkl})$ on $d_{hkl}$ is calculated, as a function of the absolute error $\Delta(2\theta)$ effecting the measurement of $2\theta$, by the Bragg relationship.

In the presence of an internal standard, this error is minimised and taken to be ordinarily equal to +0.05°. The relative intensity I/Io assigned to each $d_{hkl}$ is estimated from the height of the corresponding diffraction peak. A scale of symbols is employed to characterise this relative intensity as follows: VS=very strong, S=strong, mS=moderately strong, m=medium, mw=moderately weak, w=weak and vw=very weak.

Thermogram:

The thermograms carried out on the samples of products makes it possible to quantify the number of molecules of structuring agent and the number of molecules of water which are contained in one unit cell of the structure.

Carbon 13 NMR:

Carbon 13 NMR using incrossed polarisation with rotation to the magic angle carried out on the samples of the precursor makes it possible to confirm the presence of the structuring agent in the cavities of the product.

Determination of the Si:Al ratio

It can be carried out by means of one of the following techniques:
chemical analysis
Silicon 29 NMR
X-ray diffraction The zeolites according to the invention of the faujasite type are of a cubic structure having a value of the parameter a of the unit cell between 2.4 to 2.5 nm, the following formula referred to one unit cell (assembly of 192 tetrahedra) may be given to these cubic zeolites $$(vM_1^{q+})(wM^{n+})((SiO_2)_{192-x}(AlO_2)_x)^{x-}, (zH_2O)$$

with, in this formula, $M_1^{q+}$ denoting a q-valent cation of a metal of the group IA of the Periodic Table of Elements (q=1) or of an alkaline earth metal chosen from Ca, Sr and Ba (q=2) or a monovalent cation containing nitrogen (q=1), in particular ammonium or quaternary ammonium, $M^{n+}$ denoting a metal cation of valency n other than a cation $M_1^{q+}$, x, z, w and v being numbers such that $34 < x \leq 96$, $z \geq 0$ depending on the hydration state of the zeolite (z=0 for a completely anhydrous zeolite), $$0 < v \leq x_q \text{ and } 0 < w \leq x_n \text{ with } qv + wn \leq x$$

Table I below shows the X-ray diffraction diagram characteristic of cubic zeolites of the faujasite type after calcination of the products at 500° C. for 4 hours.

The $d_{hkl}$ column gives the mean values of the interlattice distances. Each of these values must be assigned with the measurement error $\Delta(d_{hkl})$ of between +0.1 and +0.004.

The variations which can be observed with respect to these mean values are essentially linked to the nature of the compensation cations and to the Si/Al ratio of the zeolite. The same remarks are to be applied to the relative intensities I/Io.

TABLE I

| X-ray diffraction diagram of the zeolites after calcination | | | |
|---|---|---|---|
| 2 θ (degrees) | $d_{hkl}$ ($10^{-1}$ nm) | I/Io | hkl |
| 6.29 | 14.04 ± 0.2 | VS | 111 |
| 10.23 | 8.63 | mS | 220 |
| 11.99 | 7.37 | mS | 311 |
| 12.52 | 7.06 | vw | 222 |
| 15.75 | 5.61 ± 0.1 | S | 331 |
| 17.72 | 5.00 | vw | 422 |
| 18.79 | 4.72 | mS | 511 |
| 20.47 | 4.33 | mS | 440 |
| 21.43 | 4.14 | w | 531 |
| 21.75 | 4.08 | vw | 442 |
| 22.91 | 3.87 | S | 620 |
| 23.75 | 3.74 | S | 533 |
| 24.03 | 3.70 | mw | 622 |
| 25.08 | 3.54 | w | 444 |
| 25.90 | 3.44 | mw | 551 |
| 27.16 | 3.280 ± 0.02 | mS | 642 |
| 27.88 | 3.197 | m | 731 |
| 29.75 | 3.000 | m | 733 |
| 30.86 | 2.894 | mw | 660/822 |
| 31.51 | 2.836 | S | 555/751 |
| 32.56 | 2.747 | mS | 840 |
| 33.19 | 2.696 | mS | 753/911 |
| 33.85 | 2.645 | w | 842 |
| 34.20 | 2.619 | m | 664 |
| 34.80 | 2.575 | mw | 931 |
| 35.77 | 2.508 | w | 844 |
| 37.27 | 2.410 | w | 862 |

TABLE I-continued

X-ray diffraction diagram of the zeolites after calcination

| 2 θ (degrees) | $d_{hkl}$ ($10^{-1}$ nm) | I/Io | hkl |
|---|---|---|---|
| 37.84 | 2.375 | mw | 951 |
| 38.01 | 2.365 | mw | 666 |

The precursors of zeolites which are produced during the crystallisation stage of the process according to the invention and whose calcination leads to zeolites whose formulae have been defined above, are crystalline aluminosilicates having a Si:Al ratio which is larger than 1 and may exceed 3, which have the cubic structure of faujasite corresponding to an X-ray diffraction diagram comparable to that given in Table II and which possess cavities trapping molecules of structuring agent ST, which are chosen from the polyoxaalkylamines and/or polyoxaarylamines of general formula (I).

TABLE II

X-ray diffraction diagram of the zeolite precursor

| 2 θ (degrees) | $d_{hkl}$ ($10^{-1}$ nm) | I/Io | hkl |
|---|---|---|---|
| 6.28 | 14.06 ± 0.2 | VS | 111 |
| 10.26 | 8.65 | mS | 220 |
| 11.97 | 7.37 | mS | 311 |
| 12.51 | 7.07 | vw | 222 |
| 15.73 | 5.63 ± 0.1 | S | 331 |
| 17.75 | 4.99 | w | 422 |
| 18.77 | 4.73 | mS | 511 |
| 20.44 | 4.34 | mS | 440 |
| 21.40 | 4.15 | w | 531 |
| 21.69 | 4.09 | vw | 442 |
| 22.87 | 3.88 | S | 620 |
| 23.73 | 3.74 | S | 533 |
| 24.00 | 3.70 | mw | 622 |
| 25.07 | 3.54 | vw | 444 |
| 25.85 | 3.44 | mw | 551 |
| 27.12 | 3.284 ± 0.02 | mS | 642 |
| 27.85 | 3.200 | mw | 731 |
| 29.72 | 3.003 | m | 733 |
| 30.83 | 2.898 | mS | 660/822 |
| 31.48 | 2.839 | S | 555/751 |
| 32.54 | 2.749 | mS | 840 |
| 33.15 | 2.699 | mS | 753/911 |
| 33.82 | 2.647 | mw | 842 |
| 34.17 | 2.621 | m | 664 |
| 34.76 | 2.578 | mw | 931 |
| 35.73 | 2.510 | w | 844 |
| 37.24 | 2.412 | vw | 862 |
| 37.80 | 2.367 | mw | 951 |
| 37.98 | 2.366 | mw | 666 |

The zeolites obtained by the process according to the invention are usable in the same types of application as the zeolites of similar structure and of comparable or smaller Si:Al ratio prepared by similar or different methods.

The zeolites obtained according to the invention are thus suitable as adsorbent to carry out the selective adsorption of molecules whose dimensions are smaller than 0.8 nm or else, after having been subjected to exchange reactions with various cations, as catalysts or catalyst components usable in the reactions of catalytic conversion of organic compounds and especially of hydrocarbonaceous compounds. For instance, by exchange treatment with ammonium cations followed by calcination, it is possible to obtain the protonated form of the zeolite. This form as well as those resulting from an exchange treatment with rare earth cations such as lanthanum are appropriate as acid catalysts for the hydrocracking of oil feedstocks. The zeolites may also be subjected to exchange treatment with cations of metals of the groups II to VIII of the Periodic Table of Elements to form appropriate products as hydrocarbon conversion catalysts. For their applications as catalysts, the zeolites modified by exchange with cations conferring on them catalytic properties may be used alone or in the form of composite products resulting from the mixture of these modified zeolites with other catalytically active products and/or with an amorphous matrix such as silica gel or else a mixed gel of silica and of another oxide such as magnesia, alumina, titanium oxide, zirconium oxide, the said matrix being used to endow the catalyst with, among other things, better thermal stability.

The composite catalysts associating one or more catalytically active zeolites to a matrix based on silica gel or on a mixed gel of silica and of another oxide are particularly appropriate for moving bed or fluid bed operations, as they can easily be shaped into grains having the required dimensions for these operations, for example by spray drying an aqueous suspension of the ingredients they are composed of.

The following examples are given without any implied limitation to illustrate the invention.

In these examples, the quantities and percentages are given by weight unless stated otherwise.

EXAMPLE 1

An aluminosilicate gel was prepared first of all by operating as follows in a vessel of appropriate capacity, the contents of the said vessel being kept stirring throughout the operation.

16.2 g of water, 1.2 g of sodium hydroxide NaOH and, after dissolution of the sodium hydroxide, 3.23 g of structuring agent consisting of tris(3,6-dioxaheptyl) amine (TDA-1) (ARDRICH Chemie 95%) were introduced into the vessel. After total dissolution, 1.82 g parts of sodium aluminate (Carlo Erba) containing 56% of $Al_2O_3$ and 37% of $Na_2O$ were added to the contents of the vessel.

After dissolution of the aluminate, 15 g of a colloidal suspension of silica (Cecasol 40) containing 40% of $SiO_2$ and 60% of water were then introduced into the vessel.

An aluminosilicate gel was thus obtained, the molar composition of which, based on one mole of $Al_2O_3$, follows:

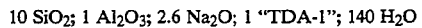

10 $SiO_2$; 1 $Al_2O_3$; 2.6 $Na_2O$; 1 "TDA-1"; 140 $H_2O$

The gel obtained was subjected to a substantial maturing period at room temperature for 7 days in a sealed vessel. The pH of the reaction mixture is 13. The matured gel was then placed in an autoclave and maintained at 100° C. in the latter for 8 days to form a crystallised product. After crystallisation the final pH is 12. The crystals obtained were separated from the reaction medium by filtration, and then washed with distilled water to low basicity (pH below 9) of the aqueous washes and were finally dried in an oven at approximately 80° C.

The dried crystals were then calcined at 500° C. for 4 hours in order to eliminate the molecules of the structuring agent used and to obtain the zeolite.

Before calcination, the crystallised product exhibits an X-ray diffraction diagram comparable to that given in Table II, the said product having moreover a Si:Al ratio equal to 3.7 and containing in its micropores water molecules and structuring agent molecules. The occluded species in the micropores of the zeolite (water and structuring agent) represent 21% of the zeolite precursor.

The zeolite formed by calcination of the above crystallised product exhibits an X-ray diffraction diagram comparable to that given in Table I.

The formula found for this zeolite, referred to one unit cell of 192 tetrahedra, can be written in the anhydrous state as $$40,8 Na^+ [(SiO_2)_{151,2}(AlO_2)_{40,8}]^{40,8-}$$

EXAMPLE 2

This example illustrates the possibility of obtaining the zeolite precursor with an aging period of the order of 24 hours.

The molar composition of the reaction medium is as follows:

$$10\ SiO_2;\ 1\ Al_2O_3;\ 2.6\ Na_2O;\ 1\ TDA\text{-}1;\ 140\ H_2O$$

After maturing (24 hours) the preparation is placed in the same type of autoclave as that described in Example 1.

The initial pH is 13, the duration and the temperature of the reaction are respectively 7 days and 100° C. After reaction (final pH of 12), the product is recovered by filtration, washed and then dried in an oven at 80° C. Its X-ray diffraction spectrum is comparable to that of Table II. The lattice parameter determination ($a_o = 24.601$ Å) leads to a Si/Al framework ratio of 3.7. The loss of mass obtained by thermogravimetry is 20.6%.

EXAMPLE 3

The operation is carried out as per Example 1 with, however, a lower NA$_2$O content.

The aluminosilicate gel, before maturing, has the following molar composition based on one mole of Al$_2$O$_3$: 10 SiO$_2$; 1 Al$_2$O$_3$; 2.4 Na$_2$O; 1 TDA-1; 140 H$_2$O (engaged fraction of 1/100).

The duration of maturing is 7 days. The temperature and the duration of the reaction are respectively 100° C. and 14 days.

The X-ray diffraction diagram of the product is similar to that given in Table II. However, the crystalline fraction content is only 60%. The zeolite crystals are dimensioned between 1 and 3 micrometers.

EXAMPLE 4

This example is similar to Example 3: it differs however by the following parameters:
duration of maturing 24 hours at 25° C.
reaction temperature 115° C.
duration of reaction 50 days.

The preparation placed in an autoclave coated with a lining in polytetrafluoroethylene is then brought to the reaction temperature for the duration necessary for crystallisation.

The solid recovered exhibits an X-ray diffraction diagram similar to that of Table II. The crystalline fraction content in this case is of the order of 95%.

The Si/Al ratio of the solid determined by chemical analysis 3.8.

EXAMPLE 5

This example illustrates the possibility of using nuclei of a preceding preparation in the reaction medium, which allows the duration of synthesis to be decreased substantially.

The molar composition is as follows:

$$10\ SiO_2;\ 1\ Al_2O_3;\ 2.6\ Na_2O;\ 1\ TDA\text{-}1;\ 140\ H_2O$$

The mixture contains 2% by weight of nuclei of the zeolite of Example 1 relative to the mass of SiO$_2$.

The synthesis protocol is similar to that gives in Example 1. Maturing lasts 48 hours and the duration of reaction and the temperature of reaction are 4.5 days and 115° C.

The solid recovered after washing, and then drying at 80° C., exhibits an X-ray diffraction diagram characteristic of the zeolite precursor of faujasite (Table II). The crystalline fraction content is in the neighbourhood of 98%. The Si/Al ratio of the solid determined by $^{29}$Si NMR is 3.7.

We claim:

1. In a process for preparing zeolites having an aluminosilicate framework belonging to the faujasite structural family and having a Si:Al ratio greater than 1 in which a reaction mixture having a pH greater than 10, containing water, a source of tetravalent silicon, a source of trivalent aluminum, a source of hydroxide ions in the form of a strong base and a structuring agent ST is formed to provide an aluminosilicate gel having a composition required to permit its crystallization as a compound of the faujasite structural family, maintaining the gel at a temperature not higher than 150° C. and under a pressure at least equal to the autogenous pressure of the mixture which comprises the gel, for a period of time sufficient to carry out crystallization of the gel as a zeolite precursor having the structuring agent ST trapped in its cavities and calcining the precursor to destroy the structuring agent and to produce zeolite, the improvement which comprises using a structuring agent ST comprising at least one compound selected from the group consisting of polyoxaalkylamines and polyoxaarylamines of the formula:

$$H_{(3-y)}N[(C_mH_{2m-1}X\text{—}O)_n\text{—}R]_y \qquad (I)$$

wherein X denotes a moiety which is the same or different for each repeating unit to the next and is selected from the groups consisting of hydrogen, an OH radical, an alkyl group and an aryl group; R denotes a hydrogen atom or a C$_1$ to C$_3$ group and is the same or different from one recurring unit to the next when y is greater than 1; m is 2 or 3 and is the same or different for each repeating unit to the next, n is a number ranging from 1 to 4 and y is a number ranging from 1 to 3.

2. A process of claim 1, wherein the amount of structuring agent ST in the reaction mixture to form the gel is such that a molar ratio ST:Al$^{III}$ ranges from 0.4 to 4.

3. A process of claim 1 wherein the structuring agent ST comprises at least one compound selected from the group consisting of (CH$_3$—O—CH$_2$CH$_2$—O—CH$_2$CH$_2$)$_3$N, (C$_2$H$_3$O—CH$_2$CH$_2$—O—CH$_2$CH$_2$)$_3$N, (CH$_3$O(C$_6$H$_4$)—O—CH$_2$CH$_2$—O—CH$_2$CH$_2$)$_3$N, (CH$_3$—O—CH$_2$—CH$_2$—O—CH$_2$CH$_2$)$_2$NH, and (C$_2$H$_5$O—CH$_2$CH$_2$—O—CH$_2$CH$_2$)$_2$NH.

4. A process of claim 1 wherein the source of tetravalent silicon is selected from the group consisting of finely divided silicas in the form of hydrogels, aerogels or colloidal suspensions, water-soluble silicates, and hydrolysable silicate esters.

5. A process of claim 1 wherein the source of trivalent aluminium is selected from the group consisting of aluminium salts, aluminium oxides and hydroxides, and aluminium esters.

6. A process of claim 1 wherein the source of hydroxide ions is selected from the group consisting of the hydroxides of the alkali metals of group IA of the Periodic Table of Elements, hydroxides of the alkaline earth metals Ca, Sr and Ba, and quaternary ammonium hydroxides.

7. A process of claim 1 wherein the reaction mixture contains $M^{N+}$ cations of at least one metal M, of valency n, other than metals whose hydroxides are used as the source of hydroxide ions, in amounts such that the molar ratio $M^{n+}:Al^{III}$ in the mixture is not greater than 0.4.

8. A process of claim 1 wherein, before initiating gel crystallization, crystallization nuclei are added to the reaction mixture in an amount ranging from 0.1% to 10% by weight of the reaction mixture, the crystallization gel nucleic being produced by milling a zeolite of the same structure as the crystalline phase which is produced.

9. A process of claim 1 wherein, before initiating gel crystallization, the gel is subjected to maturing in a closed vessel at a temperature below the crystallization temperature for a period ranging from about 6 hours to about 8 days.

10. A process of claim 1 wherein crystallization of the aluminosilicate gel is carried out by maintaining the gel at a temperature ranging from 90° C. to 120° C. for a period of from 2 hours to 30 days.

11. A process of claim 1 wherein the zeolite precursor is calcined at a temperature above 300° C.

12. A process of claim 4 wherein the silicate ester comprise tetraallylorthosilicates of the formula $Si_1(OR)_4$ wherein R is a $C_1$ to $C_4$ alkyl group.

13. A process of claim 5 wherein the aluminum ester comprises aluminum trialkoxides of the formula $Al(OR)_3$ wherein R is a $C_1$ to $C_4$ alkyl group.

14. A process of claim 7 wherein the ratio of $M^{n+}:Al^{III}$ is not greater than 0.3.

15. A process of claim 11 wherein the zeolite precursor is calcined at a temperature of from 400° C. to 700° C.

16. A process of claim 2 wherein the $ST:Al^{III}$ ratio is from 0.5 to 3.

17. A process of claim 1 wherein the components $Si^{IV}$, $Al^{III}$, OH, ST and $H_2O$ forming the reaction mixture comprising the aluminosilicate gel are present, in terms of molar ratios, within the following ranges:

| | |
|---|---|
| $Si^{IV}:Al^{III}$ | 2 to 20 |
| $OH^-:Al^{III}$ | 2 to 12 |
| $ST:Al^{III}$ | 0.4 to 4 |
| $H_2O:Al^{III}$ | 40 to 200 |

18. A zeolite precursor having an aluminosilicate framework belonging to the faujasite structural family comprising aluminosilicates having a Si:Al ratio above 1, having a structure which is substantially the same as that of a faujasite and having cavities trapping molecules of at least one structuring agent ST, cavities trapping molecules of at least one structuring agent ST, wherein the structuring agent is selected from the group consisting of polyoxyalkylamines and polyoxyarylamines of the formula:

$$H_{(3-y)}N[(C_mH_{2m-1}X-O)_n-R]_y \qquad (I)$$

wherein X denotes a moiety which is the same or different for each repeating unit to the next and is selected from the group consisting of hydrogen, an OH radical, an alkyl group and an aryl group; R denotes a hydrogen atom or a $C_1$ to $C_3$ group and is the same or different for each repeating unit to the next when y is greater than 1; m is 2 or 3 and is the same or different for each repeating unit to the next, n is a number ranging from 1 to 4 and y is a number ranging from 1 to 3.

19. A precursor of claim 18, wherein the structuring agent ST comprises at least one composition selected from the group consisting of $CH_3OCH_2CH_2OCH_2CH_2)_3N$, $(C_2H_5-O-CH_2CH_2OCH_2CH_2)_3N$, $(CH_3O(C_5H_4)-O-CH_2CH_2OCH_2CH_2)_3N$, $(CH_3-O-CH_2CH_2-O-CH_2CH_2)_2NH$ and $(C_2H_5-O-CH_2CH_2-O-CH_2CH_2)_2NH$.

20. A precursor of claim 18 having an X-ray diffraction diagram as follows:

| 2 θ (degrees) | $d_{hkl}$ ($10^{-1}$ nm) | I/Io | hkl |
|---|---|---|---|
| 6.28 | 14.06 ± 0.2 | VS | 111 |
| 10.26 | 8.65 | mS | 220 |
| 11.97 | 7.37 | mS | 311 |
| 12.51 | 7.07 | vw | 222 |
| 15.73 | 5.63 ± 0.1 | S | 331 |
| 17.75 | 4.99 | w | 422 |
| 18.77 | 4.73 | mS | 511 |
| 20.44 | 4.34 | mS | 440 |
| 21.40 | 4.15 | w | 531 |
| 21.69 | 4.09 | vw | 442 |
| 22.87 | 3.88 | S | 620 |
| 23.73 | 3.74 | S | 533 |
| 24.00 | 3.70 | mw | 622 |
| 25.07 | 3.54 | vw | 444 |
| 25.85 | 3.44 | mw | 551 |
| 27.12 | 3.284 ± 0.02 | mS | 642 |
| 27.85 | 3.200 | mw | 731 |
| 29.72 | 3.003 | m | 733 |
| 30.83 | 2.898 | mS | 660/822 |
| 31.48 | 2.839 | S | 555/751 |
| 32.54 | 2.749 | mS | 840 |
| 33.15 | 2.699 | mS | 753/911 |
| 33.82 | 2.647 | mw | 842 |
| 34.17 | 2.621 | m | 664 |
| 34.76 | 2.578 | mw | 931 |
| 35.73 | 2.510 | w | 844 |
| 37.24 | 2.412 | vw | 862 |
| 37.80 | 2.367 | mw | 951 |
| 37.98 | 2.366 | mw | 666 |

21. A catalyst or adsorbent comprising a calcined precursor of claim 18.

22. A catalyst or adsorbent comprising a calcined precursor of claim 19.

23. A zeolite absorbent or catalyst which comprises a calcined precursor of claim 19 having an aluminosilicate framework of the faujasite structural family, a Si:Al ratio greater than 1 and a structure which is substantially the same as that of faujasite.

24. A zeolite of claim 23 wherein the Si:Al ratio is greater than 3.

25. A zeolite adsorbent or catalyst of claim 23 wherein said calcined precursor presents an X-ray diffraction diagram as follows:

| 2 θ (degrees) | $d_{hkl}$ ($10^{-1}$ nm) | I/Io | hkl |
|---|---|---|---|
| 6.29 | 14.04 ± 0.2 | VS | 111 |
| 10.23 | 8.63 | mS | 220 |
| 11.99 | 7.37 | mS | 311 |
| 12.52 | 7.06 | vw | 222 |
| 15.75 | 5.61 ± 0.1 | S | 331 |
| 17.72 | 5.00 | vw | 422 |
| 18.79 | 4.72 | mS | 511 |
| 20.47 | 4.33 | mS | 440 |
| 21.43 | 4.14 | w | 531 |
| 21.75 | 4.08 | vw | 442 |
| 22.91 | 3.87 | S | 520 |
| 23.75 | 3.74 | S | 533 |
| 24.03 | 3.70 | mw | 622 |
| 25.08 | 3.54 | w | 444 |
| 25.90 | 3.44 | mw | 551 |
| 27.16 | 3.280 ± 0.02 | mS | 642 |
| 27.88 | 3.197 | m | 731 |
| 29.75 | 3.000 | m | 733 |
| 30.86 | 2.894 | mw | 660/822 |
| 31.51 | 2.836 | S | 555/751 |
| 32.56 | 2.747 | mS | 840 |
| 33.19 | 2.696 | mS | 753/911 |
| 33.85 | 2.645 | w | 842 |
| 34.20 | 2.619 | m | 664 |
| 34.80 | 2.575 | mw | 931 |
| 35.77 | 2.508 | w | 844 |
| 37.27 | 2.410 | w | 862 |
| 37.84 | 2.375 | mw | 951 |
| 38.01 | 2.365 | mw | 666 | and has a unit cell of the cubic structure having a parameter of between 2.4 and 2.5 μm and showing the formula:

$$(vM_1^{q+})(wM^{n+})((SiO_2)_{192-x}(AlO_2)_x)^{x-}, (zH_2O)$$

in which $M_1^{q+}$ denotes a q-valent cation of a metal of group 1A of the Periodic Table of Elements (q=1) or of an alkaline earth metal selected from the group consisting of Ca, Sr and Ba (q=2) or a nitrogen-containing monovalent cation (q=1), $M^{n+}$ denotes a cation of at least one metal M of valency n other than a cation $M^{q+}$ and x, z, v and w are numbers such that $34 < x \leq 96$, $z \geq 0$ and, depending on the hydration state of the precursor, $$0 < v \leq x_q \text{ and } 0 < w \leq x_n \text{ with group } qv + wn \geq x$$

26. A process of claim 18 wherein the components comprising the aluminosilicate gel are present in terms of molar ratios, within the following ranges:

| | |
|---|---|
| $Si^{IV}:Al^{III}$ | 4 to 10 |
| $OH^-:Al^{III}$ | 3 to 10 |
| $ST:Al^{III}$ | 0.5 to 3 |
| $H_2O:Al^{III}$ | 50 to 150 |

* * * * *